United States Patent
Brauer

(10) Patent No.: US 12,379,130 B2
(45) Date of Patent: Aug. 5, 2025

(54) GAS MONITORING DEVICE AND SYSTEM

(71) Applicant: Joyson Safety Systems Acquisition LLC, Auburn Hills, MI (US)

(72) Inventor: Salvatore Brauer, Goodrich, MI (US)

(73) Assignee: Joyson Safety Systems Acquisition LLC, Auburn Hills, MI (US)

( * ) Notice: Subject to any disclaimer, the term of this patent is extended or adjusted under 35 U.S.C. 154(b) by 630 days.

(21) Appl. No.: 17/711,544

(22) Filed: Apr. 1, 2022

(65) Prior Publication Data

US 2022/0316745 A1    Oct. 6, 2022

Related U.S. Application Data

(60) Provisional application No. 63/171,346, filed on Apr. 6, 2021.

(51) Int. Cl.
*F24F 11/79* (2018.01)
*F24F 11/30* (2018.01)
(Continued)

(52) U.S. Cl.
CPC ............. *F24F 11/79* (2018.01); *F24F 11/30* (2018.01); *F24F 11/63* (2018.01);
(Continued)

(58) Field of Classification Search
CPC .......... F24F 11/79; F24F 11/30; F24F 11/632; F24F 13/0209; F24F 13/10; F24F 2110/66; B60H 1/008; B60H 1/00792
See application file for complete search history.

(56) References Cited

U.S. PATENT DOCUMENTS 3,596,936 A * 8/1971 Dieckmann ............. F16L 59/18
                                                              285/423
3,810,695 A    5/1974 Shea
(Continued)

FOREIGN PATENT DOCUMENTS

CN        103674846          3/2014
CN        104272035 A        1/2015
(Continued)

OTHER PUBLICATIONS

Non-Final Office Action in connection to U.S. Appl. No. 17/224,046, dated Oct. 6, 2022.
(Continued)

*Primary Examiner* — Steven B McAllister
*Assistant Examiner* — Charles R Brawner
(74) *Attorney, Agent, or Firm* — Meunier Carlin & Curfman LLC

(57) ABSTRACT

Various implementations include a device for monitoring gas that includes a sensor, a first conduit, a second conduit, a first valve, and a second valve. The sensor includes an inlet and outlet port and is configured to monitor a feature of the gas flowing through an HVAC unit. The first conduit includes a first end and a second end spaced apart from the first end. The second end of the first conduit is in fluid communication with the inlet port of the sensor. The second conduit includes a first end and a second end spaced apart from the first end. The first end of the second conduit is in fluid communication with the outlet port of the sensor. The first valve is upstream from and in fluid communication with the inlet port, and the second valve is downstream from and in fluid communication with the outlet port.

18 Claims, 5 Drawing Sheets

(51) Int. Cl.
*F24F 11/63* (2018.01)
*F24F 13/02* (2006.01)
*F24F 13/10* (2006.01)
*F24F 110/66* (2018.01)

(52) U.S. Cl.
CPC .......... *F24F 13/0209* (2013.01); *F24F 13/10* (2013.01); *F24F 2110/66* (2018.01)

(56) References Cited

U.S. PATENT DOCUMENTS

| | | | |
|---|---|---|---|
| 4,943,159 | A | 7/1990 | Oetliker |
| 6,471,136 | B1* | 10/2002 | Chatterjee ............. F25D 17/042 237/2 B |
| 6,770,488 | B1 | 8/2004 | Carron |
| 9,851,250 | B1 | 12/2017 | Emadi et al. |
| 2005/0178433 | A1* | 8/2005 | Zelczer .................. G05D 7/03 137/115.23 |
| 2008/0053196 | A1* | 3/2008 | Fraden .................. G01F 1/699 73/31.04 |
| 2008/0252892 | A1 | 10/2008 | Pralle |
| 2009/0266183 | A1* | 10/2009 | Hall ....................... G01R 35/00 73/865.9 |
| 2012/0097376 | A1 | 4/2012 | Lin et al. |
| 2013/0237906 | A1 | 9/2013 | Park |
| 2015/0268158 | A1 | 9/2015 | Laudo |
| 2016/0238494 | A1* | 8/2016 | Chrin, II ............ G01N 33/0073 |
| 2016/0310622 | A1* | 10/2016 | Goetz ..................... A61L 2/206 |
| 2016/0327475 | A1 | 11/2016 | Hayashi et al. |
| 2018/0077363 | A1 | 3/2018 | Kester et al. |
| 2019/0021684 | A1 | 1/2019 | Ruebel et al. |
| 2019/0368966 | A1* | 12/2019 | Mizrahi ................ F24F 13/084 |
| 2020/0064291 | A1 | 2/2020 | Varganov |
| 2020/0225673 | A1 | 7/2020 | Afrouzi et al. |
| 2020/0294401 | A1 | 9/2020 | Kerecsen |

FOREIGN PATENT DOCUMENTS

| | | |
|---|---|---|
| CN | 209014539 U | 6/2019 |
| JP | 2001175969 | 6/2001 |

OTHER PUBLICATIONS

International Preliminary Report on Patentability, dated Oct. 20, 2022.
Office Action issued for U.S. Appl. No. 108/203,406, dated Dec. 22, 2023.
Office Action for U.S. Appl. No. 18/203,406 dated Jun. 13, 2024.

* cited by examiner

GAS MONITORING DEVICE AND SYSTEM

CROSS-REFERENCE TO RELATED APPLICATIONS

This application claims the benefit of U.S. Provisional Patent Application No. 63/171,346, filed Apr. 6, 2021, the content of which is incorporated herein by reference in its entirety.

BACKGROUND

Gases flowing through a heating, ventilation, and air conditioning (HVAC) unit of an automobile can include unwanted or potentially harmful particles. Thus, there is a need for a device to monitor the gases flowing through the HVAC unit and automobile.

SUMMARY

Various implementations include a device for monitoring gas in a heating, ventilation, and air conditioning (HVAC) unit. The device includes a sensor, a first conduit, a second conduit, a first valve, and a second valve. The sensor is configured to monitor a feature of a portion of the gas flowing through an HVAC unit. The sensor includes an inlet port and an outlet port. The first conduit includes a first end and a second end spaced apart from the first end. The second end of the first conduit is in fluid communication with the inlet port of the sensor. The second conduit includes a first end and a second end spaced apart from the first end. The first end of the second conduit is in fluid communication with the outlet port of the sensor. The first valve is disposed upstream from and in fluid communication with the inlet port of the sensor. The second valve is disposed downstream from and in fluid communication with the outlet port of the sensor.

In some implementations, the device further includes a third conduit and a fourth conduit. The third conduit includes a first end and a second end spaced apart from the first end. The fourth conduit includes a first end and a second end spaced apart from the first end. The second end of the first conduit is coupled to and in fluid communication with the first valve. The first end of the third conduit is coupled to and in fluid communication with the first valve, and the second end of the third conduit is coupled to and in fluid communication with the inlet port of the sensor. The first end of the fourth conduit is coupled to and in fluid communication with the outlet port of the sensor, and the second end of the fourth conduit is coupled to and in fluid communication with the second valve. The first end of the second conduit is coupled to and in fluid communication with the second valve.

In some implementations, the first end of the first conduit and the second end of the second conduit each include a quick disconnect fitting. In some implementations, the quick disconnect fitting includes a push-fit fitting. In some implementations, the quick disconnect fitting includes a union fitting.

In some implementations, the feature includes an amount of a predetermined type of analyte in the portion of the gas flowing through the HVAC unit. In some implementations, the predetermined type of analyte is a volatile organic compound.

In some implementations, the first valve and the second valve each include a damper. In some implementations, the first valve and the second valve each include a ball valve. In some implementations, the first valve and the second valve each include a pinch valve. In some implementations, the first valve and the second valve each include an electric solenoid valve.

In some implementations, the feature includes a first feature, and the device further includes a controller comprising a processor and a system memory. The processor is in operable communication with the first valve and the second valve. The processor executes computer-readable instructions stored on the system memory. The instructions cause the processor to move the first valve and the second valve from an open position to a closed position. The first valve and the second valve remain in the closed position for a first predetermined period of time. The first predetermined period of time is associated with a minimum time required to monitor the first feature of the portion of the gas. The instructions further cause the processor to, after the first predetermined time period, move the first valve and the second valve from the closed position to the open position.

In some implementations, the feature includes a second feature, and after the processor moves the first valve and the second valve from the closed position to the open position, the instructions further cause the processor to move the first valve and the second valve from the open position to the closed position. The first valve and the second valve remain in the closed position for a second predetermined period of time. The second predetermined period of time is associated with a minimum time required to monitor the second feature of the portion of the gas. The instructions further cause the processor to, after the second predetermined time period, move the first valve and the second valve from the closed position to the open position.

Various other implementations include a system for monitoring gas in a heating, ventilation, and air conditioning (HVAC) unit. The system include an HVAC unit and a device for monitoring gas in the HVAC unit, as described above. The HVAC unit defines a gas flow path including a first opening extending to a first portion of a gas flow path through the HVAC unit and a second opening extending to a second portion of the gas flow path. The first end of the first conduit is coupled to and in fluid communication with the first opening of the HVAC unit and the second end of the second conduit is coupled to and in fluid communication with the second opening of the HVAC unit. The HVAC unit causes the first portion to have a higher pressure than the second portion.

In some implementations, a return duct defines the first opening and the second opening. In some implementations, a supply duct defines the first opening and the second opening. In some implementations, a supply duct defines the first opening and a return duct defines the second opening.

In some implementations, the HVAC unit includes a gas-flow restriction between the first portion and the second portion to cause gas in the first portion to have higher pressure than gas in the second portion.

In some implementations, the first end of the first conduit is coupled to the first opening and the second end of the second conduit is coupled to the second opening.

In some implementations, the device further includes a third conduit and a fourth conduit. The third conduit includes a first end and a second end spaced apart from the first end. The fourth conduit includes a first end and a second end spaced apart from the first end. The second end of the first conduit is coupled to and in fluid communication with the first valve. The first end of the third conduit is coupled to and in fluid communication with the first valve, and the second end of the third conduit is coupled to and in fluid communication with the inlet port of the sensor. The first end of the fourth conduit is coupled to and in fluid communication with the outlet port of the sensor, and the second end of the fourth conduit is coupled to and in fluid communication with the second valve. The first end of the second conduit is coupled to and in fluid communication with the second valve.

In some implementations, the first end of the first conduit and the second end of the second conduit each include a quick disconnect fitting. In some implementations, the quick disconnect fitting includes a push-fit fitting. In some implementations, the quick disconnect fitting includes a union fitting.

In some implementations, the feature includes an amount of a predetermined type of analyte in the portion of the gas flowing through the HVAC unit. In some implementations, the predetermined type of analyte is a volatile organic compound.

In some implementations, the first valve and the second valve each include a damper. In some implementations, the first valve and the second valve each include a ball valve. In some implementations, the first valve and the second valve each include a pinch valve. In some implementations, the first valve and the second valve each include an electric solenoid valve.

In some implementations, the feature includes a first feature, and the device further includes a controller comprising a processor and a system memory. The processor is in operable communication with the first valve and the second valve. The processor executes computer-readable instructions stored on the system memory. The instructions cause the processor to move the first valve and the second valve from an open position to a closed position. The first valve and the second valve remain in the closed position for a first predetermined period of time. The first predetermined period of time is associated with a minimum time required to monitor the first feature of the portion of the gas. The instructions further cause the processor to, after the first predetermined time period, move the first valve and the second valve from the closed position to the open position.

In some implementations, the feature includes a second feature, and after the processor moves the first valve and the second valve from the closed position to the open position, the instructions further cause the processor to move the first valve and the second valve from the open position to the closed position. The first valve and the second valve remain in the closed position for a second predetermined period of time. The second predetermined period of time is associated with a minimum time required to monitor the second feature of the portion of the gas. The instructions further cause the processor to, after the second predetermined time period, move the first valve and the second valve from the closed position to the open position.

BRIEF DESCRIPTION OF DRAWINGS

Example features and implementations are disclosed in the accompanying drawings. However, the present disclosure is not limited to the precise arrangements and instrumentalities shown. Similar elements in different implementations are designated using the same reference numerals.

DETAILED DESCRIPTION

Figure 1:
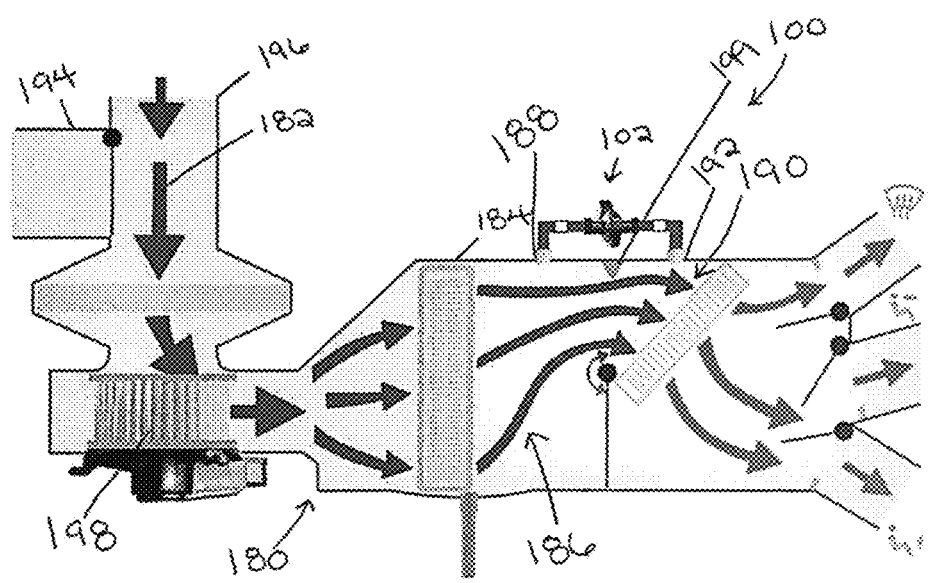
FIG. 1 is a cross-sectional view of a system for monitoring gas in a heating, ventilation, and air conditioning (HVAC) unit, according to one implementation.

The devices, systems, and methods disclosed herein provide for a system capable of monitoring gas in a heating, ventilation, and air conditioning (HVAC) unit. For example, various implementations include a device for monitoring gas in an HVAC unit. The device is capable of being coupled to and in fluid communication with the HVAC unit and includes a sensor and two valves disposed on opposite sides of the sensor. The sensor is configured for monitoring a feature of a portion of the gas flowing through the HVAC unit. The two valves are disposed on opposite sides of the sensor and are movable from an open position to a closed position to trap a portion of the gas flowing through the device within the sensor such that the sensor can monitor the stagnant gas for specific features. Once the sensor has monitored one or more features of the gas, the valves are movable from the closed position to the open position to allow the gas in the sensor to flow out of the device and new gas to flow into the device to be monitored.

The device according to some implementations further includes a first conduit and a second conduit. The sensor includes an inlet and outlet port. The first conduit includes a first end and a second end spaced apart from the first end. The second end of the first conduit is in fluid communication with the inlet port of the sensor. The second conduit includes a first end and a second end spaced apart from the first end. The first end of the second conduit is in fluid communication with the outlet port of the sensor. The two valves include a first valve disposed upstream from and in fluid communication with the inlet port of the sensor and a second valve disposed downstream from and in fluid communication with the outlet port of the sensor.

The discussion below provides additional details for the devices, systems, and methods of this disclosure and references associated figures accordingly. Certain terminology is used herein for convenience only and is not to be taken as a limitation on the claims that follow. In the drawings, the same reference numbers are employed for designating the same elements throughout the several figures. A number of examples are provided; nevertheless, it will be understood that various modifications can be made without departing from the spirit and scope of the disclosure herein. As used in the specification, and in the appended claims, the singular forms "a," "an," and "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations.

Figure 2:
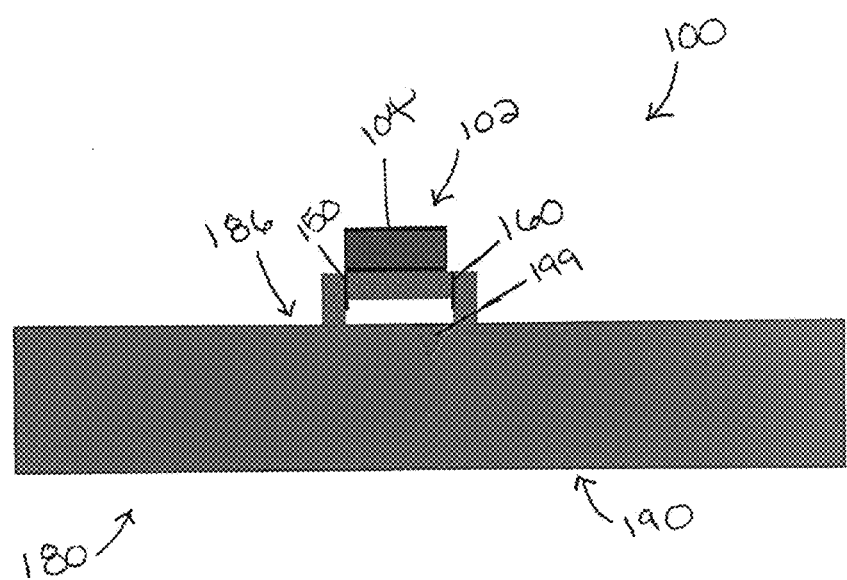
FIG. 2 is a schematic of the system of FIG. 1.

FIG. 1 shows a system 100 for monitoring gas in an HVAC unit 180, and FIG. 2 shows a schematic for the system 100 of FIG. 1. The system 100 includes an HVAC unit 180 and a device 102 for monitoring gas in the HVAC unit 180.

The HVAC unit 180 defines a gas flow path 182 that includes a supply duct 184, a return duct 194, a fresh air intake duct 196, and a fan 198. In the implementation shown in FIG. 1, the supply duct 184 defines a first opening 188 extending to a first portion 186 of the gas flow path 182 and a second opening 192 extending to a second portion 190 of the gas flow path 182. The HVAC unit 180 causes the first portion 186 to have a higher pressure than the second portion 190.

Although the supply duct 184 defines the first and second openings 188, 192 in FIG. 1, in other implementations, the return duct, the supply duct, the fresh air intake duct, or any combination of these may define the corresponding first and second openings. For example, in one implementation, the return duct defines the first and the second openings. In another implementation, the supply duct defines the first opening and the return duct defines the second opening. And, in yet another implementation, the fresh air intake defines the first opening and the second opening.

The HVAC unit 180 also includes a gas-flow restriction 199 disposed between the first portion 186 and the second portion 190. The gas-flow restriction 199 causes the gas in the first portion 186 to be at a higher pressure than the gas in the second portion 190. Although the gas-flow restriction 199 shown in FIG. 1 is a triangular prism shaped protrusion, in other implementations, the gas flow restriction is any three-dimensional shape capable of restricting the gas flow along the gas flow path or any reduction in an inner cross-sectional area of a portion of the HVAC unit as viewed in a plane perpendicular to the normal flow of gas between the first and second portions.

Figure 3:
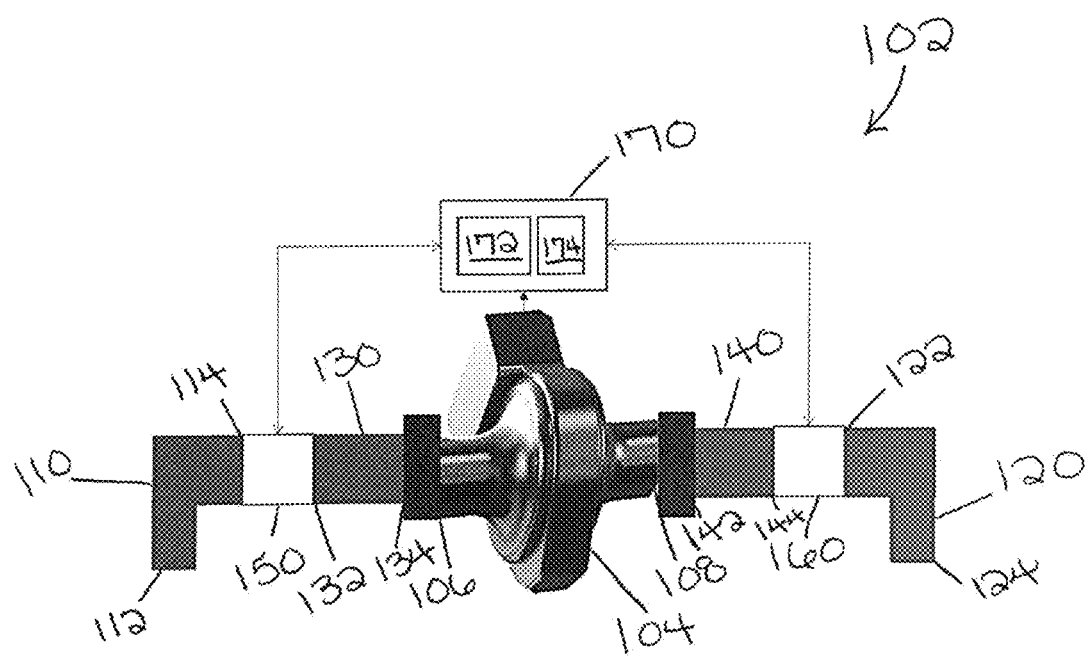
FIG. 3 is a detail view of a device shown in FIG. 1 according to one implementation.

The device 102 for monitoring gas in the HVAC unit 180 is shown in detail in FIGS. 2 and 3. The device 102 includes a first conduit 110, a second conduit 120, a third conduit 130, a fourth conduit 140, a first valve 150, a second valve 160, a sensor 104, and a controller 170.

A first conduit 110 includes a first end 112 and a second end 114 spaced apart the first end 112 along a centerline of the first conduit 110. The first end 112 of the first conduit 110 is coupled to and in fluid communication with the first opening 188. The second end 114 of the first conduit 110 is coupled to and in fluid communication with the first valve 150.

The third conduit 130 includes a first end 132 and a second end 134 spaced apart from the first end 132 along a centerline of the third conduit 130. The first end 132 of the third conduit 130 is coupled to and in fluid communication with the first valve 150. The second end 134 of the third conduit 130 is coupled to and in fluid communication with the sensor inlet port 106 such that the first valve 150 is upstream from and in fluid communication with the sensor inlet port 106.

The fourth conduit 140 includes a first end 142 and second end 144 spaced apart from the first end 142 along a centerline of the fourth conduit 140. The first end 142 of the fourth conduit 140 is coupled to and in fluid communication with the sensor outlet port 108. The second end 144 of the fourth conduit 140 is coupled to and in fluid communication with the second valve 160 such that the second valve 160 is downstream from and in fluid communication with the sensor outlet port 108.

The second conduit 120 includes a first end 122 and a second end 124 spaced apart from the first end 122 along a centerline of the second conduit 120. The first end 122 of the second conduit 120 is coupled to and in fluid communication with the second valve 160. The second end 124 of the second conduit 120 is coupled to and in fluid communication with the second opening 192.

Thus, the first, second, third, and fourth conduits 110, 120, 130, 140 and the first and second valves 150, 160 are all in fluid communication with the sensor 104 and the gas flow path 182 of the HVAC unit 180.

As used herein, the term "centerline" is used to describe the axis which runs longitudinally along a conduit through the midpoint of the conduit. A centerline can be straight, curved, or bent, or can include one or more straight, curved, or bent portions.

The first, second, third, and fourth conduits 110, 120, 130, 140 shown in FIGS. 2 and 3 are directly coupled to the first valve 150, the second valve 160, and the sensor 104, but in other implementations, the first, second, third, and/or fourth conduits are indirectly coupled to the first valve, the second valve, and/or the sensor by one or more intermediate parts.

Figure 4:
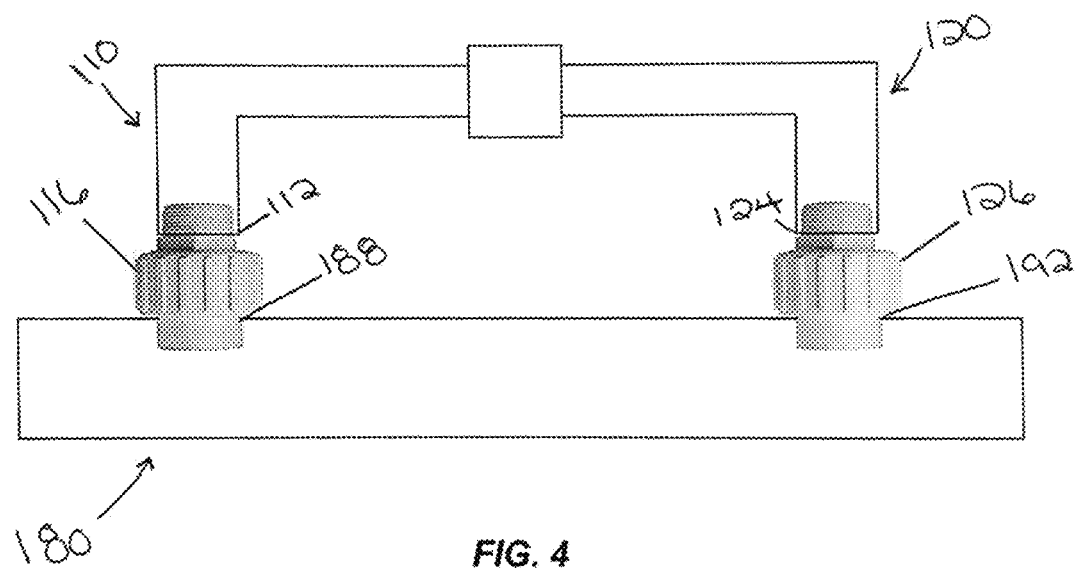
FIG. 4 is another detail view of the device of FIG. 3.

As shown in FIG. 4, the first end 112 of the first conduit 110 and the second end 124 of the second conduit 120 each include a quick disconnect fitting 116, 126. The quick disconnect fittings 116, 126 allow the first end 112 of the first conduit 110 and the second end 124 of the second conduit 120 to be easily coupled and uncoupled directly to the first opening 188 and second opening 192 of the HVAC unit 180, respectively. The quick disconnect fittings 116, 126 include union fittings in the implementation shown in FIG. 4. However, in other implementations, the quick disconnect fittings include push-fit fittings or any other fitting or fluidic coupling mechanism capable of removably coupling the device and the HVAC unit to provide an air-tight seal. In other implementations, the first end of the first conduit and the second end of the second conduit are fixedly coupled to the first opening and the second opening. In other implementations, the first end of the first conduit and the second end of the second conduit are removably coupled to the first and second openings, respectively, with any type of coupling. And, in other implementations, the sensor is removably couplable directly to the openings.

The second end 114 of the first conduit 110 and the first end 132 of the third conduit 130 are fixedly coupled to the first valve 150, and the first end 122 of the second conduit 120 and the second end 144 of the fourth conduit 140 are fixedly coupled to the second valve 160. In some implementations, fixedly coupling includes soldering, welding, adhesives, fasteners, interference fits, or any other coupling method capable of fixedly coupling the aforementioned conduit ends to their respective valves. However, in other implementations, the ends 114, 132 are removably coupled to the first valve 150 and/or the ends 122, 144 are removably coupled to the second valve 160.

The first valve 150 and the second valve 160 are movable from an open position to a closed position. The first valve 150 and second valve 160 shown in FIGS. 1 and 2 each include a damper. However, in other implementations, the first valve and the second valve may include a ball valve, a pinch valve, an electric solenoid valve, or any type of valve capable of being airtight and movable between an open position and a closed position.

In other implementations, the device includes first and second conduits but does not include third and fourth conduits, and the first and second valves are directly coupled to the sensor inlet port and the sensor outlet port, respectively. And, in other implementations, the device includes third and fourth conduits but does not include the first and second conduits, and the first and second valves are directly coupled to the first and second openings, respectively. In yet another implementation, the device does not include any conduits, and the first and second valves are directly coupled to the sensor inlet port and the sensor outlet port, respectively, and to the first and second openings, respectively.

In use, gas flows through the supply duct 184 of the HVAC unit 180. The gas-flow restriction 199 causes a pressure differential between the gas flowing through the first and second portions 186, 190 of the supply duct 184. When the first and second valves 150, 160 are in the open position, the pressure differential caused by the gas-flow restriction 199 causes gas to flow into the first end 112 of the first conduit 110, through the first valve 150, the third conduit 130, the sensor 104, the fourth conduit 140, the second valve 160, and out of the second end 124 of the second conduit 120.

The sensor 104 includes a sensor inlet port 106 and a sensor outlet port 108 and is configured to monitor at least one feature of at least a portion of the gas flowing through the HVAC unit. A portion of the gas flowing through the HVAC unit enters the sensor 104 at the sensor inlet port 106 and exits the sensor 104 at the sensor exit port 108. The feature of the gas monitored by the sensor 104 can include an amount of a predetermined type of analyte (such as a volatile organic compound or particulate matter), humidity, or any other kind of analyte that a user would want to monitor within the gas flowing through the HVAC unit 180. The analyte could be any gaseous phase chemical including but not limited to: gases that directly pose an immediate or long term health risk, gases that indirectly pose an immediate or long term health risk (e.g. gases that are byproducts of pathogens in the air, such as bacteria or viruses), gases that are perceived by humans or animals as pleasant or un-pleasant, gases that are perceived by humans to indicate cleanliness, gases that cannot be perceived by humans but could be explosive, etc. The concentration (parts per million/billion) of all the target analytes and the features that are sensed for the sensor system are directly related to the specificity and sensitivity required by the sensor system. Specificity is the ability of the sensor to reliably distinguish multiple analytes from each other and sensitivity is the concentration at which each analyte can be uniquely identified.

In one non-limiting example, the sensor operates within an HVAC system of a vehicle, and the sensor 104 shown in FIGS. 1-4 includes at least one photocatalytic micro-electro-mechanical sensor (MEMS). The MEMS sensor 104 transmits sensor data to a processor 172 connected to computerized memory 174 to monitor one or more features of the gases flowing through the HVAC unit by detecting differentials in physical responses of the MEMS. The physical responses may include, but are not limited to, electrical resistance, electrical conductivity, electrical response gradients, degrees of optical excitation, heating gradients and photoconductivity of the MEMS and/or air flow around the MEMS. Although the sensor shown in FIGS. 1-4 includes a photocatalytic MEMS, in other implementations, the sensor includes any sensor capable of monitoring at least one feature of the gases flowing through the HVAC unit.

A computer system 195 such as that of FIG. 5 and described below, utilizes a controller, such as an electronic control unit ("ECU") 170 to implement software stored in computer memory 174, and the software is programmed to implement the methods of this disclosure using the above-described sensors. In some implementations, the software implements computer commands via the processor 172, which provides control signals across the network 165 in bi-directional communications to the sensors (e.g., sensor 104), valves (e.g., valves 150, 160), and associated components of the systems (e.g., system 100) described herein.

In addition, the valves 150, 160 of this disclosure are electronically controlled valves and are configured for use with the electronic controls and computer systems connected to an HVAC system, particularly an HVAC system of a vehicle having a cabin for occupants. Computer-readable instructions cause the processor 172 to move the first valve 150 and the second valve 160 between open and closed positions to trap and release portions of the gas between the valves 150, 160 so that the portion of gas can be monitored by the sensor 104. For example, computer-readable instructions cause the processor 172 to move the first valve 150 and the second valve 160 from the open position to the closed position, which traps a portion of gas between the first and second valves 150, 160, and to remain closed for a predetermined period of time. The predetermined period of time is associated with a minimum time required for the sensor 104 to monitor the feature to be monitored of the portion of the gas trapped between the valves 150, 160. However, longer measurement durations are directly proportional to improved signal to noise levels. As such, measurement durations can be pre-determined based on the analyte specificity and sensitivity required. After the predetermined period of time, the computer-readable instructions cause the processor 172 to move the first valve 150 and the second valve 160 from the closed position to the open position, which allows gas flow to resume through the device 102.

The opening and closing of the valves 150, 160 may occur periodically to test for the same or different features of the gas. For example, computer-readable instructions cause the processor 172 to move the first valve 150 and the second valve 160 from the open position to the closed position, which traps a first portion of gas between the first and second valves 150, 160, and to remain closed for a first predetermined period of time that is associated with a minimum time required for the sensor 104 to monitor a first feature of the first portion of gas. After the first predetermined period of time, the computer-readable instructions cause the processor 172 to move the first valve 150 and the second valve 160 from the closed position to the open position, which allows gas flow to resume through the device 102. After the gas between the first and second valves 150, 160 is replaced, computer-readable instructions then cause the processor 172 to move the first valve 150 and the second valve 160 from the open position to the closed position, which traps a second portion of gas between the first and second valves 150, 160, and to remain closed for a second predetermined period of time that is associated with a minimum time required for the sensor 104 to monitor a second feature of the second portion of gas. After the second predetermined period of time, the computer-readable instructions cause the processor 172 to move the first valve 150 and the second valve 160 from the closed position to the open position, which allows gas flow to resume through the device 102. The second predetermined period of time can be longer, shorter, or the same as the first predetermined period of time.

The computer-readable instructions can continue to cause the processor 172 to move the first and second valves 150, 160 between the open and closed positions periodically with any amount of time between moving the valves 150, 160 from the open position to the closed position. Also, the computer-readable instructions can cause the processor 172 to cause the first and second valves 150, 160 to remain in the closed position for any number of predetermined periods of time and can use any desired order and/or frequency of predetermined periods of time.

Figure 5:
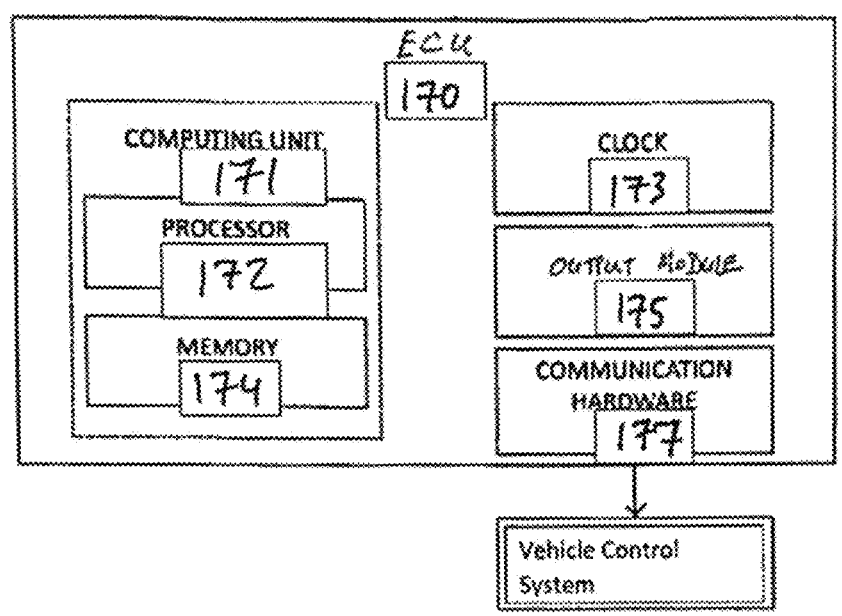
FIG. 5 is a schematic illustration of an example electronic control unit and associated computer hardware used in conjunction with the systems and methods of this disclosure.

As noted above, the systems, methods, and devices of this disclosure are configured for use with computer equipment that can control mechanical components in an electro-mechanical system, such as that shown in FIG. 5. A computerized system of these implementations may be used to collect raw data from the device 102 and utilize a wide range of available analytics. Machine learning chemometrics may enable consolidated gas prediction models to be developed in a back office, saved in computer memory 174, and utilized by an electronic control unit ("ECU") 170 and an associated processor 172. New models/functions can be pushed to the ECU 170 over the network 165.

Implementations described above and in relation to FIGS. 1-4 may be used with equipment that implements computerized methods that are activated with the ECU 170. In particular, the sensor 104 and valves 150, 160 communicate with a computer processor 172 configured to process one or more characteristics and/or profiles of the electrical signals received. By way of example and without limiting this disclosure to any particular hardware or software, FIG. 5 illustrates a block diagram of a system herein according to one implementation. The computer processor 172 shown in FIG. 5 may comprise one or more processors, and the same or different processors may execute computer-readable instructions related to the actuation of the valves and receipt of data from the sensor 104.

The ECU, also referred to as a controller 170, may include a computing unit 171, a system clock 173, an output module 175 and communication hardware 177. In its most basic form, the computing unit or controller 171 may include a processor 172 and a system memory 174. The processor 172 may be a standard programmable processor that performs arithmetic and logic operations necessary for operation of the controller 170. The processor 172 may be configured to execute program code encoded in tangible, computer-readable media. For example, the processor 172 may execute program code stored in the system memory 174, which may be volatile or non-volatile memory. The system memory 174 is only one example of tangible, computer-readable media. In one aspect, the computing unit 171 can be considered an integrated device such as firmware. Other examples of tangible, computer-readable media include hard drives, flash memory, or any other machine-readable storage media, wherein when the program code is loaded into and executed by a machine, such as the processor 172, the machine becomes an apparatus for practicing the disclosed subject matter.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the vehicle computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A number of implementations have been described. Nevertheless, it will be understood that various modifications may be made without departing from the spirit and scope of the claims. Accordingly, other implementations are within the scope of the following claims.

What is claimed is:

1. A device for monitoring gas in a heating, ventilation, and air conditioning (HVAC) unit, the device comprising:
   a sensor configured to monitor a feature of a portion of the gas flowing through an HVAC unit, the sensor comprising an inlet port and an outlet port;
   a first conduit comprising a first end and a second end spaced apart from the first end, wherein the second end of the first conduit is in fluid communication with the inlet port of the sensor;
   a second conduit comprising a first end and a second end spaced apart from the first end, wherein the first end of the second conduit is in fluid communication with the outlet port of the sensor;
   a first valve disposed upstream from and in fluid communication with the inlet port of the sensor; and a second valve disposed downstream from and in fluid communication with the outlet port of the sensor;

wherein the feature comprises a first feature, and the device further comprises a controller comprising a processor and a system memory, the processor being in operable communication with the first valve and the second valve, wherein the processor executes computer-readable instructions stored on the system memory, the instructions causing the processor to:

move the first valve and the second valve from an open position to a closed position, wherein the first valve and the second valve remain in the closed position for a first predetermined period of time, wherein the first predetermined period of time is associated with a minimum time required to monitor the first feature of the portion of the gas, and after the first predetermined time period, move the first valve and the second valve from the closed position to the open position.

2. The device of claim 1, further comprising:
a third conduit comprising a first end and a second end spaced apart from the first end; and
a fourth conduit comprising a first end and a second end spaced apart from the first end,
wherein:
the second end of the first conduit is coupled to and in fluid communication with the first valve,
the first end of the third conduit is coupled to and in fluid communication with the first valve and the second end of the third conduit is coupled to and in fluid communication with the inlet port of the sensor,
the first end of the fourth conduit is coupled to and in fluid communication with the outlet port of the sensor and the second end of the fourth conduit is coupled to and in fluid communication with the second valve, and
the first end of the second conduit is coupled to and in fluid communication with the second valve.

3. The device of claim 1, wherein the first end of the first conduit and the second end of the second conduit each comprise a quick disconnect fitting.

4. The device of claim 1, wherein the feature comprises an amount of a predetermined type of analyte in the portion of the gas flowing through the HVAC unit.

5. The device of claim 4, wherein the predetermined type of analyte is a volatile organic compound.

6. The device of claim 1, wherein the first valve and the second valve each comprise an electric solenoid valve.

7. The device of claim 1, wherein the feature comprises a second feature, and wherein, after the processor moves the first valve and the second valve from the closed position to the open position, the instructions further cause the processor to:

move the first valve and the second valve from the open position to the closed position, wherein the first valve and the second valve remain in the closed position for a second predetermined period of time, wherein the second predetermined period of time is associated with a minimum time required to monitor the second feature of the portion of the gas, and after the second predetermined time period, move the first valve and the second valve from the closed position to the open position.

8. A system for monitoring gas in a heating, ventilation, and air conditioning (HVAC) unit, the system comprising:
an HVAC unit defining a gas flow path comprising a first opening extending to a first portion of a gas flow path through the HVAC unit and a second opening extending to a second portion of the gas flow path; and
a device for monitoring gas in the HVAC unit, the device comprising:
a sensor configured to monitor at least one feature of a portion of the gas flowing through the HVAC unit, the sensor comprising an inlet port and an outlet port,
a first conduit comprising a first end and a second end spaced apart from the first end, wherein the second end of the first conduit is in fluid communication with the inlet port of the sensor,
a second conduit comprising a first end and a second end spaced apart from the first end, wherein the first end of the second conduit is in fluid communication with the outlet port of the sensor,
a first valve disposed upstream from and in fluid communication with the inlet port of the sensor; and
a second valve disposed downstream from and in fluid communication with the outlet port of the sensor, wherein the first end of the first conduit is coupled to and in fluid communication with the first opening of the HVAC unit and the second end of the second conduit is coupled to and in fluid communication with the second opening of the HVAC unit, wherein the HVAC unit causes the first portion to have a higher pressure than the second portion;

wherein the feature comprises a first feature, and the device further comprises a controller comprising a processor and a system memory, the processor being in operable communication with the first valve and the second valve, wherein the processor executes computer-readable instructions stored on the system memory, the instructions causing the processor to:

move the first valve and the second valve from an open position to a closed position, wherein the first valve and the second valve remain in the closed position for a first predetermined period of time, wherein the first predetermined period of time is associated with a minimum time required to monitor the first feature of the portion of the gas, and after the first predetermined time period, move the first valve and the second valve from the closed position to the open position.

9. The system of claim 8, wherein a return duct defines the first opening and the second opening.

10. The system of claim 8, wherein a supply duct defines the first opening and the second opening.

11. The system of claim 8, wherein a supply duct defines the first opening and a return duct defines the second opening.

12. The system of claim 8, wherein the HVAC unit comprises a gas-flow restriction between the first portion and the second portion to cause gas in the first portion to have higher pressure than gas in the second portion.

13. The system of claim 8, wherein the device further comprises:
a third conduit comprising a first end and a second end spaced apart from the first end; and
a fourth conduit comprising a first end and a second end spaced apart from the first end,
wherein:
the second end of the first conduit is coupled to and in fluid communication with the first valve,
the first end of the third conduit is coupled to and in fluid communication with the first valve and the second end of the third conduit is coupled to and in fluid communication with the inlet port of the sensor, the first end of the fourth conduit is coupled to and in fluid communication with the outlet port of the sensor and the second end of the fourth conduit is coupled to and in fluid communication with the second valve, and the first end of the second conduit is coupled to and in fluid communication with the second valve.

14. The system of claim 8, wherein the first end of the first conduit and the second end of the second conduit each comprise a quick disconnect fitting.

15. The system of claim 8, wherein the feature comprises an amount of a predetermined type of analyte in the portion of the gas flowing through the HVAC unit.

16. The system of claim 15, wherein the predetermined type of analyte is a volatile organic compound.

17. The system of claim 8, wherein the first valve and the second valve each comprise an electric solenoid valve.

18. The system of claim 8, wherein the feature comprises a second feature, and wherein, after the processor moves the first valve and the second valve from the closed position to the open position, the instructions further cause the processor to:

move the first valve and the second valve from the open position to the closed position, wherein the first valve and the second valve remain in the closed position for a second predetermined period of time, wherein the second predetermined period of time is associated with a minimum time required to monitor the second feature of the portion of the gas, and after the second predetermined time period, move the first valve and the second valve from the closed position to the open position.

* * * * *